(12) United States Patent
Richardson et al.

(10) Patent No.: US 7,619,973 B2
(45) Date of Patent: Nov. 17, 2009

(54) DYNAMIC TRAFFIC BANDWIDTH MANAGEMENT SYSTEM AND METHOD FOR A COMMUNICATION NETWORK

(75) Inventors: John William Richardson, Hamilton, NJ (US); Thomas Anthony Stahl, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 712 days.

(21) Appl. No.: 10/483,536

(22) PCT Filed: Jul. 20, 2001

(86) PCT No.: PCT/US01/22878
§ 371 (c)(1),
(2), (4) Date: Jan. 12, 2004

(87) PCT Pub. No.: WO03/009541
PCT Pub. Date: Jan. 30, 2003

(65) Prior Publication Data
US 2005/0174938 A1   Aug. 11, 2005

(51) Int. Cl.
*G01R 31/08* (2006.01)
*G08C 15/00* (2006.01)
*H04J 1/16* (2006.01)
*H04J 3/14* (2006.01)
*H04L 1/00* (2006.01)
*H04L 12/28* (2006.01)
*H04L 12/56* (2006.01)
*H04J 3/16* (2006.01)
*H04J 3/22* (2006.01)

(52) U.S. Cl. ............... 370/232; 370/235.1; 370/395.21; 370/468

(58) Field of Classification Search ............ 370/468
See application file for complete search history.

(56) References Cited

U.S. PATENT DOCUMENTS 5,596,576 A * 1/1997 Milito ...................... 370/450

(Continued)

FOREIGN PATENT DOCUMENTS

EP   0923268   6/1999

(Continued)

OTHER PUBLICATIONS

The Authoritative Dictionary of IEEE Standards Terms, 2000, Standards Information Network IEEE Press, Seventh Edition, p. 684.*

(Continued)

*Primary Examiner*—William Trost, IV
*Assistant Examiner*—Andrew Chriss
(74) *Attorney, Agent, or Firm*—Robert D. Shedd; Paul P. Kiel

(57) ABSTRACT

An apparatus and a method for managing service traffic in a communications network capable of providing voice, data, and A/V services to a plurality of customers. In particular, the present invention is a digital subscriber line system (DSL), preferably based on ADSL, having a plurality of customer premise equipment (CPEs) coupled to voice, data and A/V services via network system equipment comprising a DSLAM, an ATM switch and a DSL terminator for connecting the system to the internet. The invention provides a network control system that includes a plurality of databases including a provisioning database and a real time database indicative of the actual bandwidth being utilized. A service control processor coupled to the plurality of databases and the network system equipment periodically polls the databases to determine the amount of bandwidth being used, and if the usage exceeds a predetermined level, throttles the internet data entering the system through the DSL terminator and/or the user data entering the system through the CPEs. Preferably, throttling is performed using a leaky-bucket algorithm. By dynamically managing the traffic flow in the network, the present invention reduces the potential for dropped calls and similar service restrictions.

13 Claims, 11 Drawing Sheets

U.S. PATENT DOCUMENTS

| | | | |
|---|---|---|---|
| 5,680,396 A * | 10/1997 | Moritomo et al. | 370/392 |
| 5,710,855 A * | 1/1998 | Konwitz | 385/135 |
| 5,710,885 A * | 1/1998 | Bondi | 709/224 |
| 6,075,784 A * | 6/2000 | Frankel et al. | 370/356 |
| 6,222,856 B1 * | 4/2001 | Krishnan et al. | 370/468 |
| 6,229,788 B1 * | 5/2001 | Graves et al. | 370/230 |
| 6,459,427 B1 * | 10/2002 | Mao et al. | 725/109 |
| 6,904,596 B1 * | 6/2005 | Clark et al. | 719/310 |
| 7,046,665 B1 * | 5/2006 | Walrand et al. | 370/392 |
| 2002/0044567 A1 | 4/2002 | Voit et al. | 370/467 |
| 2002/0147833 A1 | 10/2002 | Richardson et al. | 709/236 |

FOREIGN PATENT DOCUMENTS

| | | |
|---|---|---|
| WO | 99/53656 | 10/1999 |
| WO | 00/39948 | 7/2000 |
| WO | WO 0039948 A1 * | 7/2000 |
| WO | 01/26313 | 4/2001 |

OTHER PUBLICATIONS

D. Gan et al.: "Traffic policing in ATM networks with multimedia traffic: the super leaky bucket", Computer Communications, Elsevier Science Publishers BV, Amsterdam, NL. vol. 22, Nr. 5, pp. 439-450, Publication Date: 1999.

Search report dated Feb. 19, 2002.

* cited by examiner

DYNAMIC TRAFFIC BANDWIDTH MANAGEMENT SYSTEM AND METHOD FOR A COMMUNICATION NETWORK

This application claims the benefit, under 35 U.S.C. § 365 of International Application PCT/US01/22878, filed Jul. 20, 2001, which was published in accordance with PCT Article 21(2) on Jan. 30, 2003 in English.

The present invention generally relates to communications networks, and more particularly, to a method of managing traffic in a communications network to prevent overload conditions and facilitate an acceptable quality of service for customers requesting different types of services.

Changing communications demands are transforming the existing public information network from one limited to voice, text and low resolution graphics to bringing multimedia, including full motion video, to everyone's home. A key communications transmission technology that is enabling transformation of existing public information networks to accommodate higher bandwidth needs is Asymmetric Digital Subscriber Line ("ADSL"), a modem technology. ADSL converts existing twisted-pair telephone lines into access paths for multimedia and high-speed data communications. ADSL can transmit up to 8 Mbps (Megabits per second) to a subscriber, and as much as 960 kbps (kilobits per second) or more in both directions. Such rates expand existing access capacity by a factor of 50 or more without new cable installations.

Asymmetric Digital Subscriber Line ADSL technology involves modems attached across twisted pair copper wiring in which transmission rates from 1.5 Mbps to 8 Mbps downstream (to the subscriber) and from 16 kbps to 960 kbps upstream (from the subscriber), depending on line distance, can be achieved. Asynchronous transfer mode ATM is an ultra high-speed cell based data transmission protocol that may be run over ADSL. Plain old telephone service ("POTS") refers to basic analog telephone service. POTS takes the lowest 4 kHz bandwidth on twisted pair wiring. Any service sharing a line with POTS must either use frequencies above POTS or convert POTS to digital and interleave with other data signals.

In a DSL network, there are several potential blocking points, for example, between the digital subscriber line access multiplexer ("DSLAM") and the ATM switch. The circuit between the DSLAM and the ATM switch can carry multiple types of services, such as voice, video and internet data. Each service carried on the link has a different requirement in terms of bandwidth and quality of service. A problem may arise when the link becomes overloaded. This can cause calls to be dropped and/or refused. It can also cause loss of cells or packets in a variable bit rate transmission of video. Thus, the effect of overloading this link can be detrimental to the service provided.

Therefore, it is desirable to dynamically manage the bandwidth provided to the various services to prevent system overload conditions and to provide an acceptable quality of service for the various types of services.

The present invention provides a system and a method for dynamically managing a network to prevent overload conditions. In particular, the present invention provides a management entity that is aware of each connection and the bandwidth usage associated with each connection in the system. If a near overload condition is sensed, for example 10%-15% of maximum, the bandwidth management system automatically throttles back the internet traffic in order to provide bandwidth for voice and video connections. Once the near overload condition has been resolved, the system releases the restrictions on the internet traffic and restores the service back to a normal condition.

In the exemplary embodiment, the system comprises an ADSL system that provides a user with a telephone connection, A/V connection and an internet connection. The management entity associated with the system periodically queries various databases for information on the number and types of connections in use to calculate the amount of bandwidth being used. If this amount of bandwidth approaches a predetermined level, for example 85%-90% of the maximum amount of available bandwidth, the management entity controls certain access connections to temporarily throttle back the internet traffic. For downstream throttling, the management entity controls the back-end entry point of the DSL network, in this case the DSL terminator. For upstream throttling, the management entity controls the customer entry point of the DSL network, in this case at the customer premise equipment ("CPE"). In the exemplary embodiment, the throttling is performed using a "leaky-bucket" algorithm and is controlled through SNMP or other similar protocol. Further, the amount of throttling may be controlled in response to the amount of load the system is experiencing. The present dynamic bandwidth management system is a continually running background process that is set to periodically poll the system to collect information on the resource availability.

The invention will now to be described in detail in connection with accompanying drawings wherein.

It should be understood that the drawings are for purposes of illustrating the concepts of the invention and are not necessarily the only possible configuration for illustrating the invention.

Figure 1:
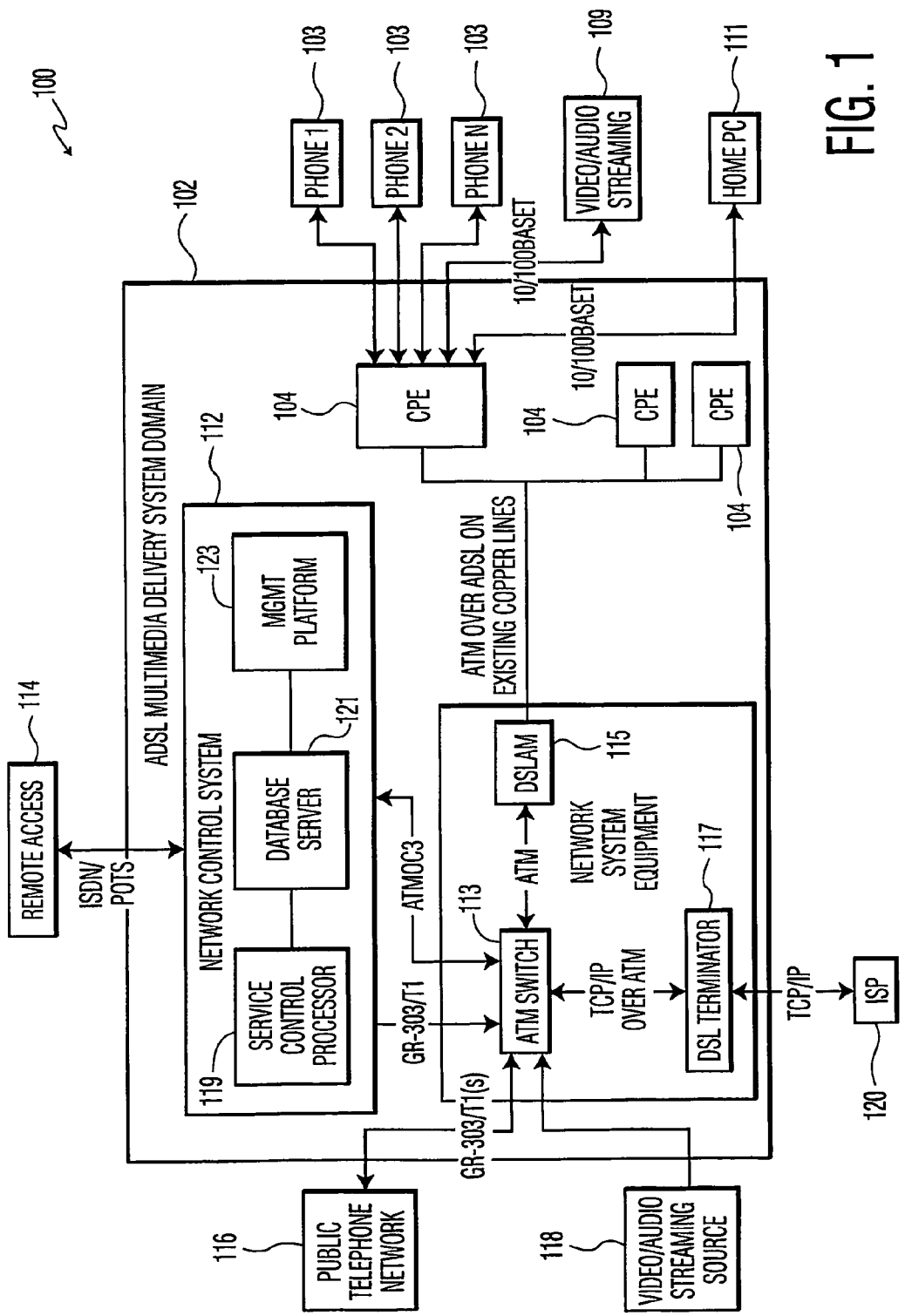
FIG. 1 is an exemplary digital subscriber line (DSL) system architecture capable of offering integrated multi-line telephony services such as voice, data and video.

The present invention provides a system and a method for dynamically managing a network to prevent overload conditions. In particular, the present invention manages a DSL system capable of providing a variety of services, including voice, data, and video. ADSL Multimedia Delivery System 100 consists of several functional blocks as shown in FIG. 1. Details of the individual block components making up the system architecture are known to skilled artisans, and will only be described in details sufficient for an understanding of the invention.

System 100 consists of Network Control System (NCS) 112, Network System Equipment (NSE) 110, and Customer Premise Equipment (CPE) devices 104. System 100 is used to connect Customer Premise Equipment (CPE) 104 to telephone network 116, audio/video streaming source 118, and Internet Service Provider (ISP) 120. CPEs 104 are designed to allow a customer to have multiple telephones, 24 hour access to the Internet, and A/V streaming capabilities using ADSL over the existing copper wires connected to the house. CPE 104 allows for the aggregation of telephone, computer, digital A/V stream, and command ATM data onto an ADSL line between CPE 104 and NSE 110.

CPE 104 includes a DSL modem unit that interfaces with separate analog telephones over a plain old telephone service (POTS), a 10 Base-T Ethernet connection to a PC desktop system 111, and an Ethernet or RS-422 connection to a set-top box with a decoder 109 for connection to a television or video display. From the customer's analog end, the CPE device 104 accepts the analog input from each of the telephones, converts the analog input to digital data, and packages the data into ATM packets (POTS over ATM), with each connection having a unique virtual channel identifier/virtual path identifier (VCI/VPI). Known to skilled artisans, an ATM is a connection oriented protocol and as such there is a connection identifier in every cell header which explicitly associates a cell with a given virtual channel on a physical link. The connection identifier consists of two sub-fields, the virtual channel identifier (VCI) and the virtual path identifier (VPI). Together these identifiers are used for multiplexing, demultiplexing and switching a cell through the network. VCIs and VPIs are not addresses, but are explicitly assigned at each segment link between ATM nodes of a connection when a connection is established, and remain for the duration of the connection. When using the VCI/VPI, the ATM layer can asynchronously interleave (multiplex) cells from multiple connections.

Figure 2:
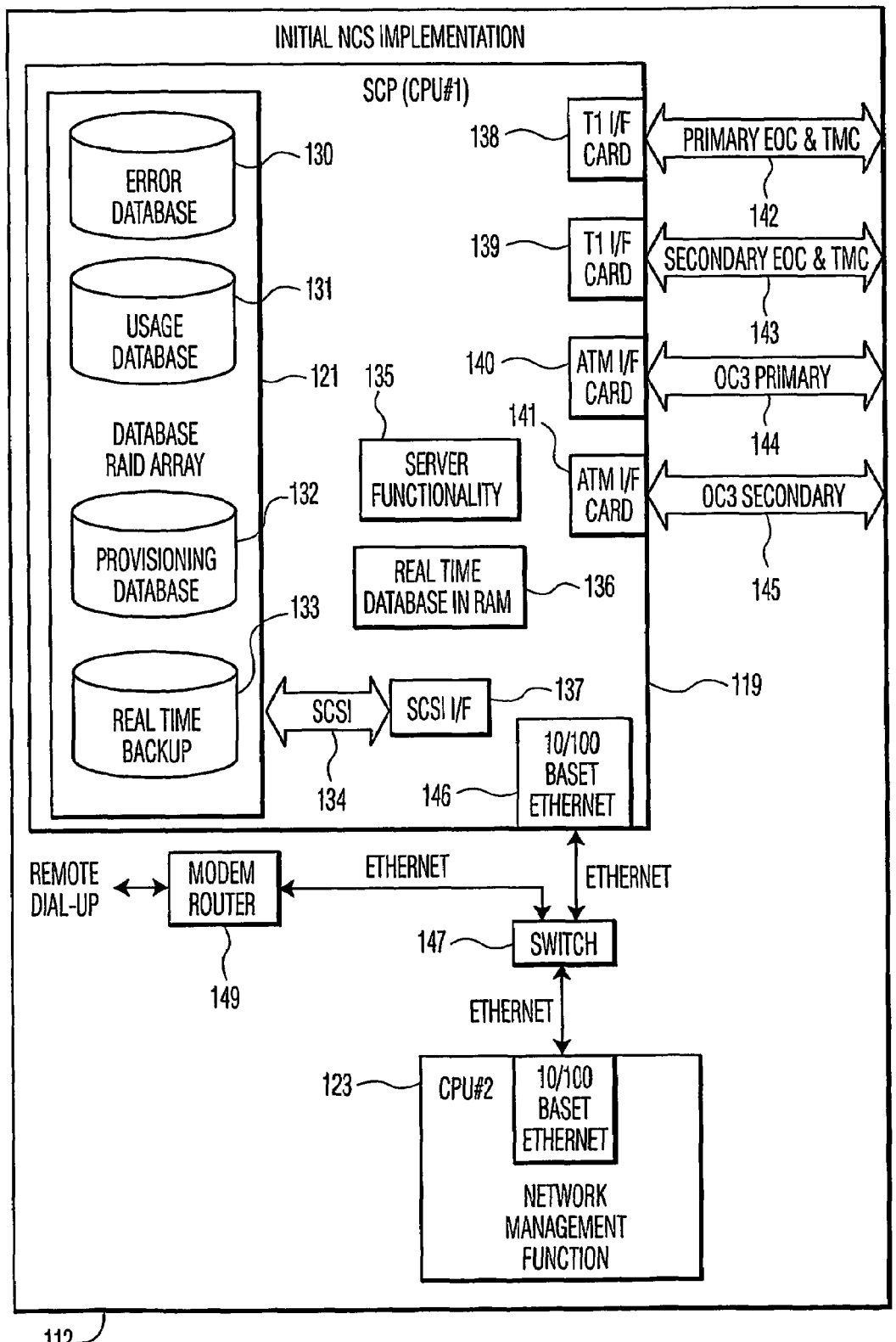
FIG. 2 is a block diagram illustrating the elements of a network control system ("NCS")

Network Control System (NCS) 112 manages Network System Equipment (NSE) 110 and the aggregation of CPEs 104. NCS 112 coordinates the data connections as well as data traffic management and error handling. NCS 112 consists of multiple computers including Service Control Processor (SCP) 119, Database Server(s) 121, and management platform 123. FIG. 2 is a block diagram illustrating the components of NCS 112. For economic reasons, there may not be enough bandwidth to handle all CPEs 104 using all of their circuits simultaneously. The amount of available bandwidth is based on statistical usage of the telephone, audio/video streaming, and computer data circuits.

NCS 112 contains five databases. These databases include provisioning database 132, usage database 131, error database 130, real-time backup database 133, and real-time database 136. Advantageously, these databases are separate databases within a server and/or may reside within SCP 119. The real-time database is a RAM based database to enhance its performance. The remaining databases may be implemented using a Redundant Array of Independent Disks (RAID) implementation, in particular a RAID level 5 implementation. This level of RAID provides data striping at the byte and error correction level giving excellent performance and good fault tolerance.

Provisioning database 132 contains information concerning the services provided to each customer connected to system 100. This database may be constructed with off-the-shelf SQL database software (e.g. Oracle, MySQL) and may be configured to be available either locally or on a dedicated server. The database interface is scalable such that different levels of data storage capabilities can be supported. The database system may consist of network attached storage units that are connected to the NCS LAN. This allows direct access through a remote device in the event that access is required for status and/or troubleshooting. Access privileges may be granted based on user ID and password making it possible to view or generate reports from the database without risking corruption.

The database contains the following information for each customer:

Customer name

Customer address

CPE serial number

DSLAM port/nailed group

DSLAM number

Number of phone lines enabled

For each phone line:
    Phone number
    Call Reference Value
    GR-303 Interface Group
    VPI/VCI on CPE
    VPI/VCI on DSLAM
    VPI/VCI on ATM switch Internet enabled (true/false) (If the customer is not Internet enabled, then no adjustment can be made to their Internet BW)

If Internet is enabled:
    IP address
    VPI/VCI on CPE to DSLAM
    VPI/VCI on DSLAM to ATM Switch
    VPI/VCI on ATM switch to DSL Terminator (VPI/VCI on link between DSL Terminator and ATM switch may be needed for adjusting downstream Internet BW)
    Upstream data rate limit
    Downstream data rate limit
    Video enabled (true/false)

If video is enabled:
    VPI/VCI on CPE to DSLAM link
    VPI/VCI on DSLAM to ATM switch link
    VPI/VCI on ATM switch to video server link The database contains the following Information about the system:

Number of Interface groups

For each Interface group:
    Primary TMC Slot Information
    Primary TMC Port Information
    Primary TMC Channel Information
    Primary EOC Slot Information
    Primary EOC Port Information
    Primary EOC Channel Information
    Secondary TMC Slot Information
    Secondary TMC Port Information
    Secondary TMC Channel Information
    Secondary EOC Slot Information
    Secondary EOC Port Information
    Secondary EOC Channel Information Number of DS0s For each DS0:
    Number
    Slot Information
    Port Information
    Channel Information Information useful for determining where to throttle downstream traffic:

Number of Internet interfaces
For each Internet interface:
Slot Information
Port Information Provisioning database 132 also includes information regarding the total system bandwidth between ATM switch 113 and the DSLAM 115.

Real-time database 136 is used to manage incoming and outgoing calls as well as other connected services. This database may be constructed with off-the-shelf SQL database software (e.g. Oracle) and can be configured to be available locally. Access privileges may be granted based on user ID and password making it possible to view or generate reports from the database without risking corruption. Real-time data base 136 includes call reference values ("CRV") and associated information for each CRV for managing calls. The CRVs are used to identify a particular caller and maps to a CPE number and a port number. Information that may be used for managing bandwidth includes the total number of active calls, possibly on a per subscriber basis (for example, the upstream throttle may cut back on internet bandwidth more for subscribers that have 4 active calls than for subscribers with no active calls).

Network management platform 123 provides a user interface for a network manager to monitor and maintain the system. Network management platform 123 may be an off-the-shelf computer using an Ethernet connection into the system. This platform provides a status and debug connection for NCS 112.

As the number of subscribers associated with NCS 112 grows and expands so must NCS 112. Each of the physical components (SCP, Databases, and Network Management platform) is designed to be scalable. Also, each of the major software modules are designed so that they can be run on the same machine or on separate machines.

Service Control Processor (SCP) 119 performs all of the functions necessary to manage NSE 110. In the present embodiment, SCP 119 performs the following major functions: GR-303 interface, NSE control, Real-time database, database server, and network management interface. To scale NCS 112 each of these functions may be run on separate computers that are networked together via a high speed network (Giga-bit Ethernet) depending on speed requirements.

All time-critical network control functionality is located on SCP 119. SCP 119 is logically connected to NSE 110 and all CPEs 104. SCP 119 is logically connected to each CPE 104 for the purpose of sending and receiving signaling data to CPE 104.

SCP 119 may consist of an off-the-shelf industrial packaged (rack-mount) computer running an operating system capable of performing the functional tasks noted above. Advantageously, additional CPUs may be added to run different operating systems depending on specific software requirements for operation. Also, additional computers may be added to keep system performance at an acceptable level. By keeping the functions separate, these functions may easily be spread out between several machines. This type of design allows the desired platform to be scalable so that additional processing power can be added with a minimum amount of re-work or design change.

The internal connections between the control circuitry within the NCS (the SCP) and the various elements that are in communication with the control circuitry are now described.

Figure 3:
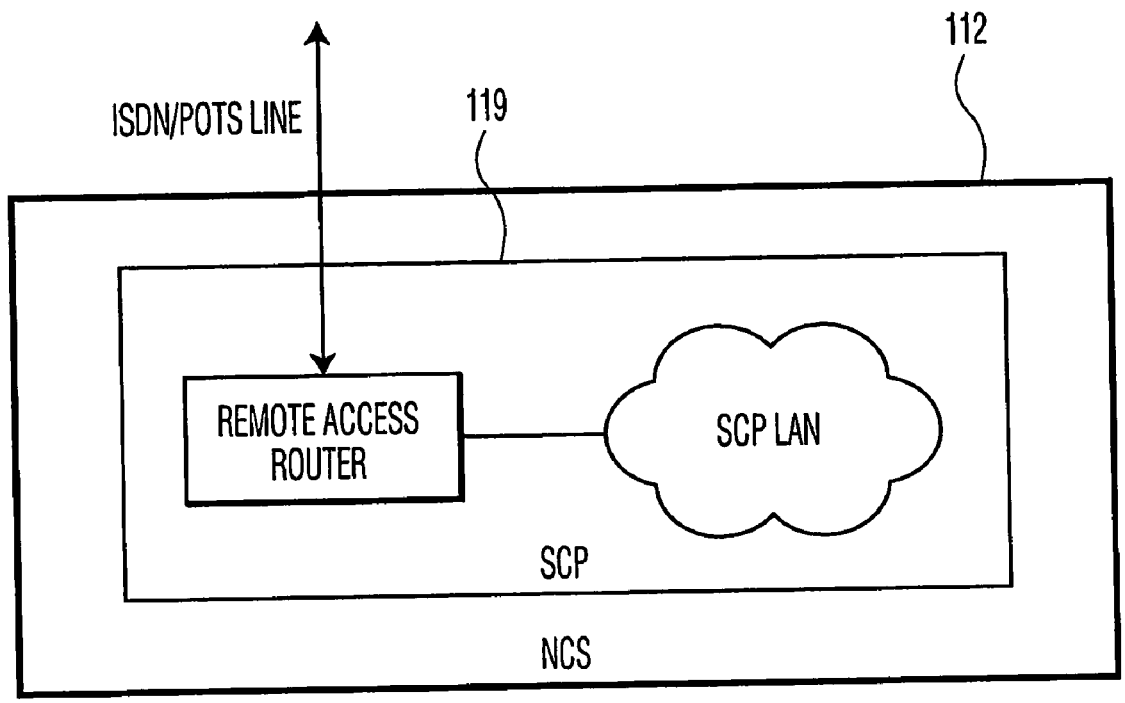
FIG. 3 is a block diagram illustrating elements for remotely accessing the NCS.

Remote network management is defined as access to the system through a "back door" mechanism. This access can be used to aid in troubleshooting the system. FIG. 3 is a block diagram of the connection that allows access to SCP 119 from outside of NCS 112. As shown in the figure, NCS 112 can be accessed via a publicly available connection (e.g., ISDN or POTS line). The connection is made through a router that allows access to the SCP's Local Area Network (LAN). This access can be used to query computers, databases, etc. for troubleshooting or general status.

Each CPE 104 is also logically connected to SCP 119. SCP 119 to CPE 104 logical connection is used to control the data paths between CPE 104, ISP 120, A/V streaming source 118, and telephone network 116. All data paths between CPEs 104 and NSE 110 have PVCs already established. This allows 24-hour access to ISP 120 and a channel that allows the exchange of control information between SCP 119 and CPE 104. The voice channels also have PVCs, but SCP 119 establishes a connection between telephone network 116 and the voice channel as calls are established.

Figure 4:
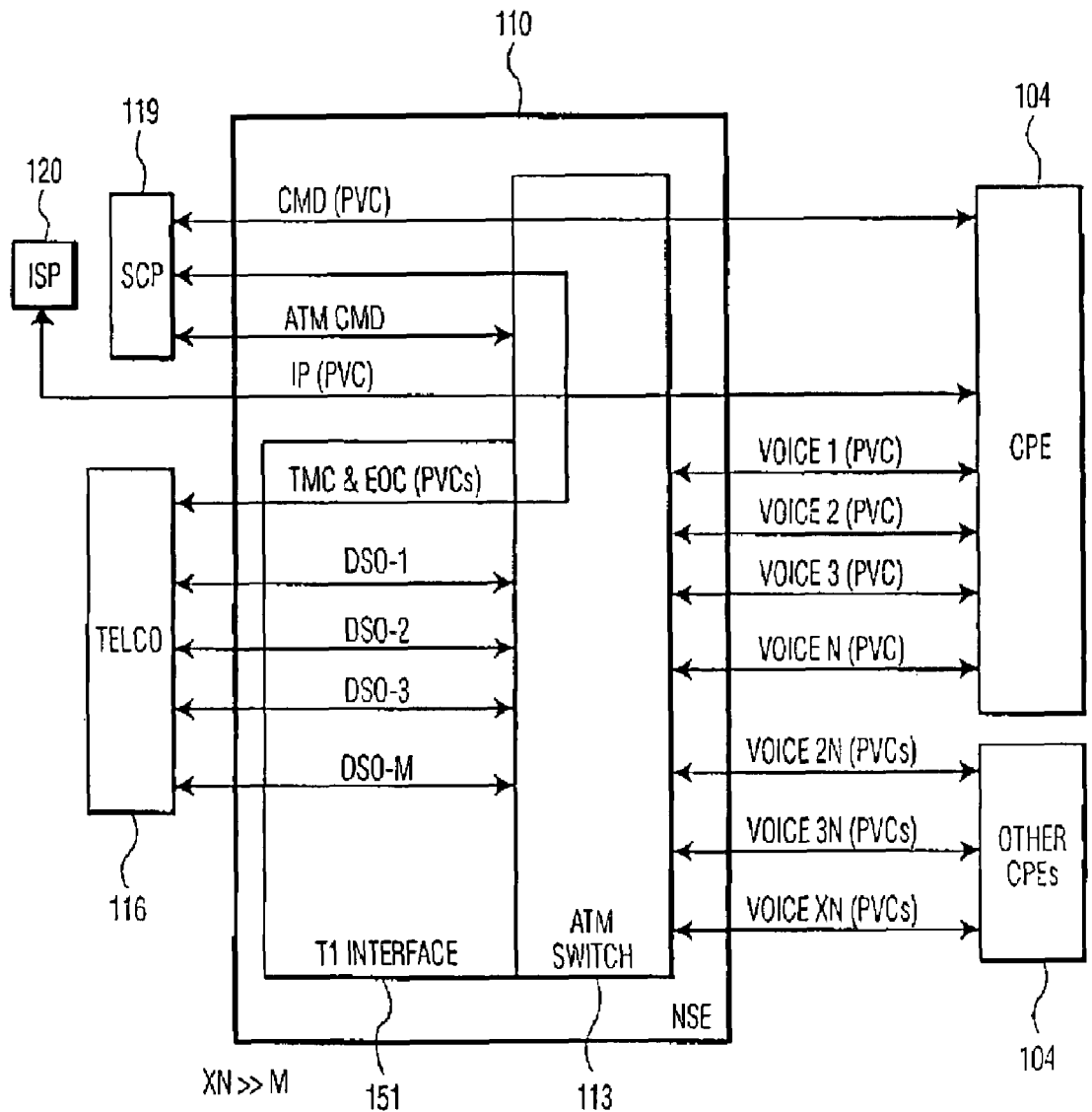
FIG. 4 is a block diagram illustrating voice channel allocation.

FIG. 4 is a block diagram that shows how voice channels are allocated between a CPE 104 and public telephone network 116. As shown in the figure, the total number of voice channels from the CPEs (XN) may be greater than the number of available DS0 slots (M) on the other side of ATM switch 113. Therefore, SCP 119 must allocate the DS0 channels dynamically as calls are connected to the CPEs 104. In the present embodiment, the number of voice channels per CPE, N, is equal to four.

SCP 119 has a command channel to ATM switch 113 that is used to issue commands to ATM switch 113 so that ATM switch 113 can route CPE 104 voice channels to T1 interface 151 and ultimately to telephone network 116.

SCP 119 includes a T1 interface for the TMC and EOC channels back to the telephone company class 5 switch. SCP 119 communicates with the Class 5 switch by using the GR-303 protocol. This protocol supports access to the telephone system 116 through a set of commands that can be exchanged between the class 5 switch and SCP 119. SCP 119 accesses the telephone network 116 in order to establish outgoing voice calls or to handle incoming voice call requests. In the present embodiment, ATM switch 113 is a Lucent Access Concentrator and functions as the routing mechanism to aggregate and disperse data to various destinations within and outside of NCS 112 and NSE 110. The physical link between ATM switch 113 and SCP 119 is an OC3 link.

Referring back to FIG. 1, NSE 110 consists of the equipment that provides the connections through the system and the physical link between CPEs 104 and the "outside" world. For system 100, the outside world consists of telephone network 116, the Internet via an ISP 120, and A/V streaming source 118. The elements of NSE 110 and the interfaces in and out of NSE 110 are described below.

ATM switch 113 is the backbone of the ATM network. ATM switch 113 performs various functions in the network, including cell transport, multiplexing and concentration, traffic control and ATM-layer management. Of particular interest in the system domain 100, ATM switch 113 provides for the cell routing and buffering in connection to DSLAM 115, network control system 112 and the Internet gateway (the Internet Protocol IP router and DSL terminator 117), and T1 circuit emulation support in connection with telephone network 116. A T1 circuit provides 24 voice channels packed into a 193 bit frame transmitted at 8000 frames per second.

The total bit rate is 1.544 Mbps. The unframed version, or payload, consists of 192 bit frames for a total rate of 1.536 Mbps.

ATM Switch 113 establishes connections between CPEs 110 and the Internet via ISP 120, an A/V streaming source 118, or telephone network 116. All data paths through ATM switch 113 are set up as PVCs. The voice channels are set up as Real-Time Variable Bit Rate (RT-VBR). This allows the set-up of all data paths to the switch even though the capacity of the data paths exceeds the capacity of link to the ATM switch. The non-blocking data paths are set up as Unspecified Bit Rate (UBR). This allows a minimum amount of bandwidth to be specified for each path.

SCP 119 controls the operation of ATM switch 113 using the SNMP protocol and API interface. This communications link is used for call setup, call tear down, and statistics gathering. Use of the in-band communications allows for non co-location of Switch 113 and SCP 119.

Figure 5:
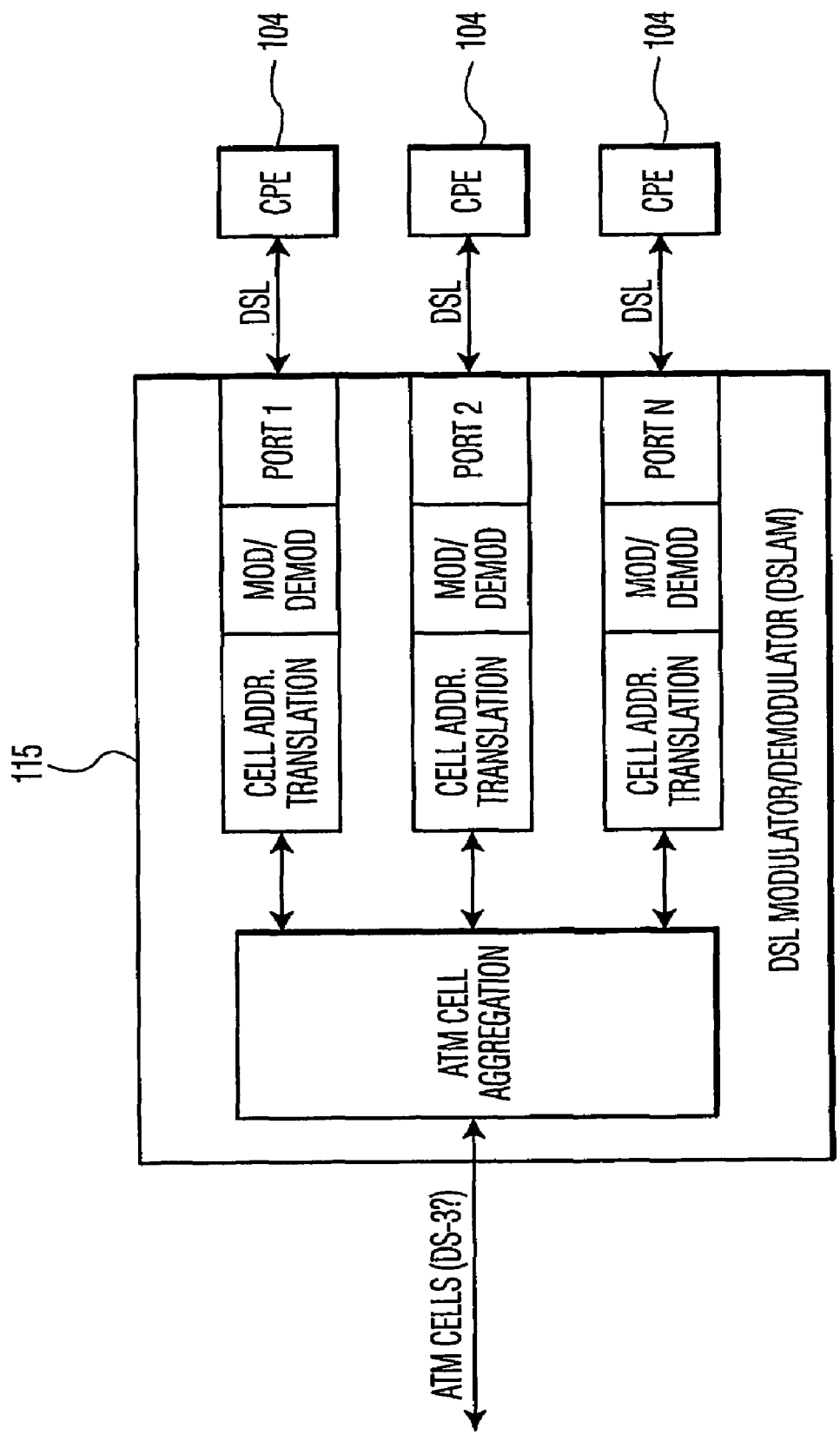
FIG. 5 is a block diagram illustrating the elements of a DSLAM.

DSLAM 115 provides the ADSL signal to/from the CPEs. The resulting data is formatted into ATM cells, which are passed on to ATM switch 113. The reverse operation is performed for ATM cells that are sent to the CPEs 104 from ATM switch 113. DSLAM 115 is shown in FIG. 5. As shown in the figure, DSLAM 115 aggregates ATM cells onto an ATM data path. Each CPE 104 requires the use of a physical port on DSLAM 115. For data coming from CPE 104, the ADSL signal is demodulated into ATM cells. The reverse operation is performed for ATM cells going back to CPEs 104. DSLAM 115 also provides Cell address translation, ATM to DSL conversion, and DSL to ATM conversion functions.

DSL Terminator 117 provides a means for connecting system 100 to the internet. DSL Terminator 117 identifies the Internet traffic and assigns the proper VPI/VCI so that data is routed to the proper destination CPE 104. DSL Terminator 117 also handles all data conversion from IP to ATM and ATM to IP. When CPE 104 transmits data, DSL Terminator 117 receives that ATM data, removes the ATM wrapper around the IP data and forwards the IP data on to the ISP 120. When ISP 120 sends data to DSL Terminator 117, DSL Terminator 117 receives the IP data, wraps that IP data in ATM and sends it on to the CPE through ATM switch 113 and DSLAM 115. In the present embodiment, DSL Terminator 117 has two 10/100BaseT ports for connecting to ISP 120. Depending on the ISP chosen, this configuration may be modified as desired. SCP 119 communicates with DSL Terminator 117 using an OC3 link from SCP 119 to ATM switch 113 and a DS3 link from ATM switch 113 to the DSL Terminator 117. Over this link SCP 119 uses in-band signaling for communications. Initial setup of DSL Terminator 117 is through the RS232 port. Once initialized, use of in-band signaling through the links described above or a direct connect to its Ethernet port are possible options.

Figure 6:
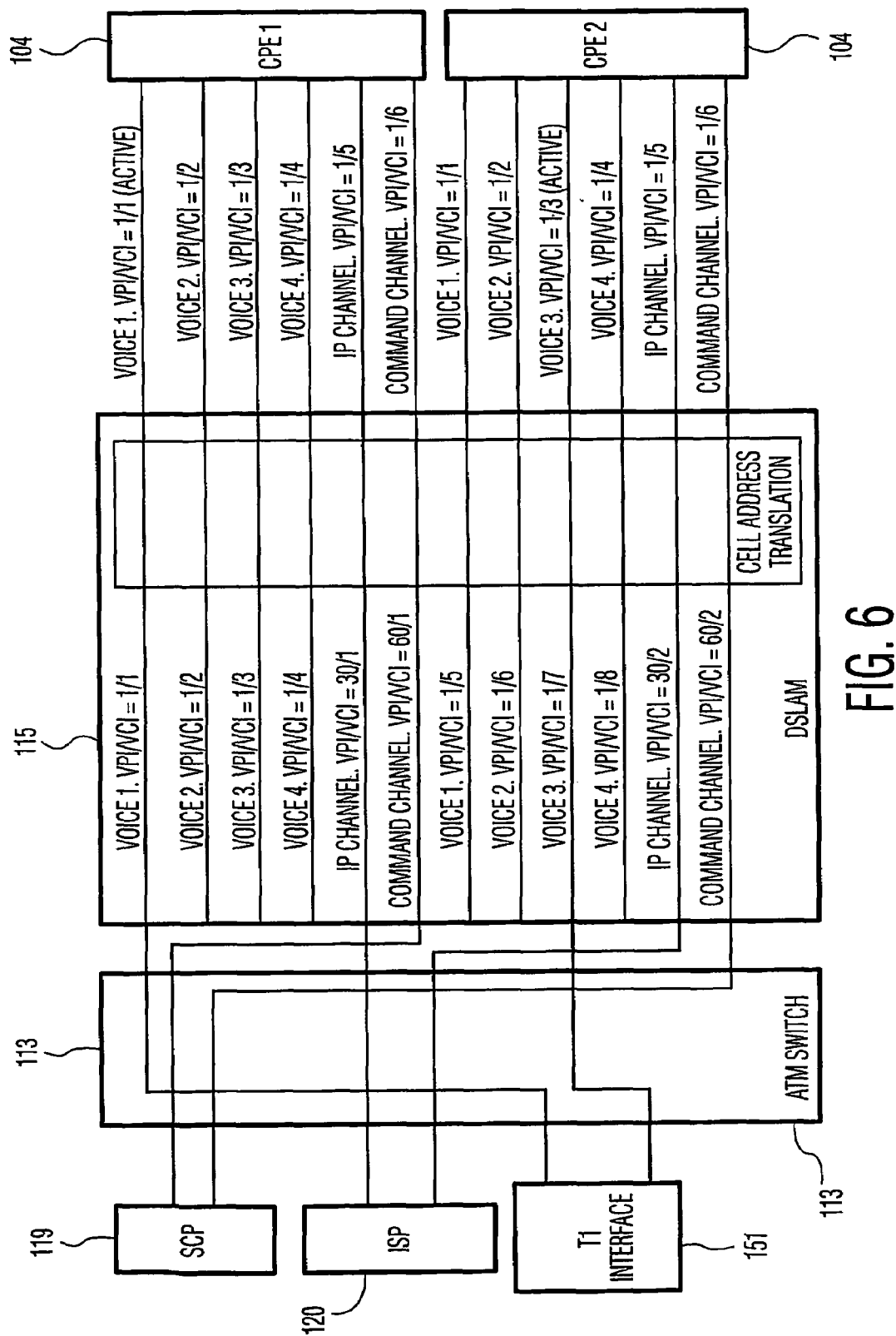
FIG. 6 is a block diagram illustrating ATM cell data path.

As ATM cells move through NSE 110, the cells can have their ATM addresses (VPIs/VCIs) translated. FIG. 6 is an example of the data paths for ATM cells from two CPEs 104. In this example, there are 2 active voice channels; Voice 1 of CPE 1 and Voice 3 of CPE 2. The other voice channels are inactive since they are not carrying any data.

Voice traffic management refers to the control of data that carries voice information throughout NSE 110 and how it is managed when there is less system capacity than the theoretical maximum amount of data that could pass through the system. For example, if there are 100 telephone lines connected to NSE 110 but only 22 DS0 channels connected to the Telco, the DS0 channels must be allocated dynamically as connections are required for each telephone connection desired.

Statistics may be used to allocate an economical amount of physical data bandwidth at various points in the system. Since this number may be less than the theoretical maximum amount of data, there are different points in the system where data blocking could occur (i.e., a voice connection cannot be completed). SCP 119 is responsible for managing the allocation of data channels as requested. In the event that a request cannot be fulfilled, SCP 119 exits from that condition and informs the requesting entity of the connection failure.

Figure 7:
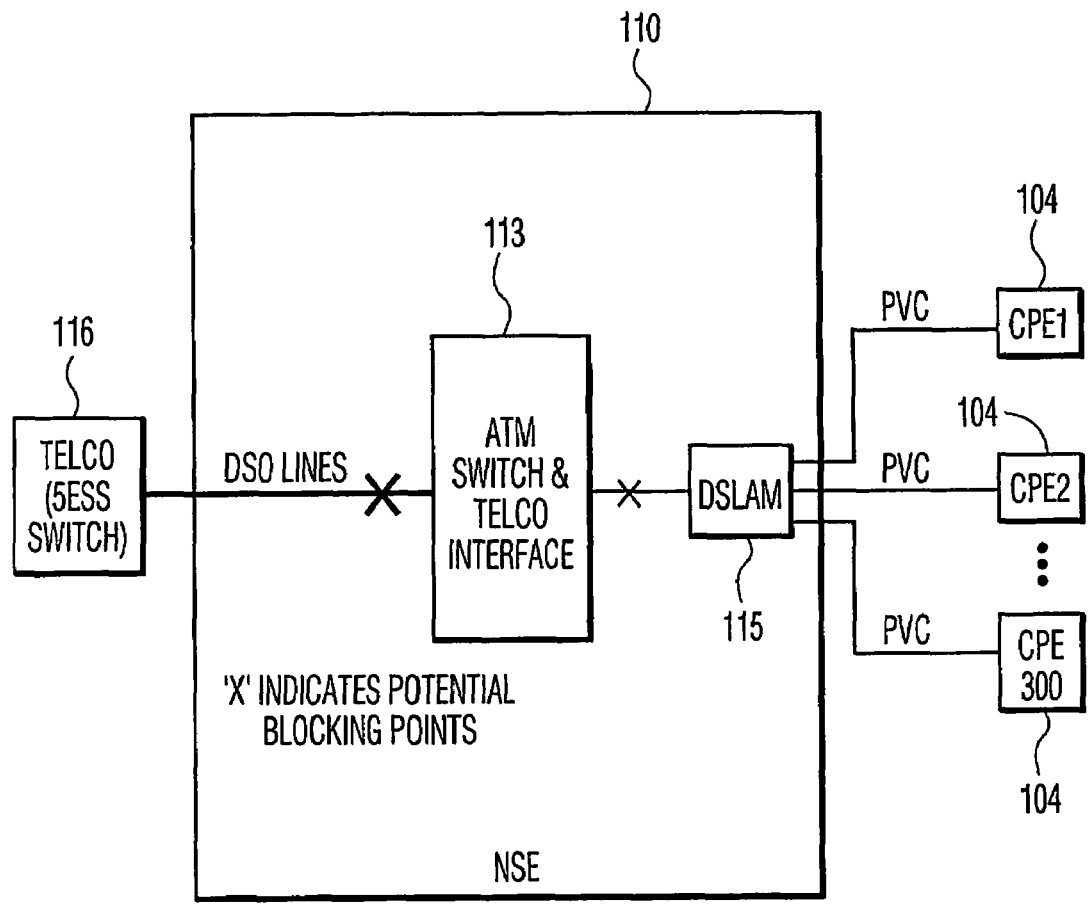
FIG. 7 is a block diagram illustrating potential blocking points for voice data.

FIG. 7 is an example of the data paths for voice traffic through the NSE 110, wherein potential blocking points are shown. Note that each CPE 104 shows a voice channel going to the NSE 110 via a PVC. As shown in the figure, there is a potential of a call being blocked at DSLAM 115 or at the Telco switch. The potential block at DSLAM 115 is determined by the size of the DSLAM-to-ATM switch data path and other services active on that link. The potential block at the Telco switch is determined by the number of available DS0 lines.

Each voice channel PVC is established when CPE 104 is connected to the system. The PVC is specified as a Real-Time Variable Bit Rate (RT-VBR). This allows DSLAM 115 and ATM switch 113 to be "over subscribed". That is, ATM switch 113 will allow all of the connections to be established since they are set up as RT-VBR. CPE 104 will not transmit data on any voice channel until commanded to do so by SCP 119. When an "off-hook" condition is signaled by CPE 104 to SCP 119, SCP 119 will determine if there is enough bandwidth for a connection to be made. If there is not enough bandwidth the request will go into a LIFO queue and await processing. If bandwidth is available the request will be processed by the GR-303 stack and a connection made.

Figure 8:
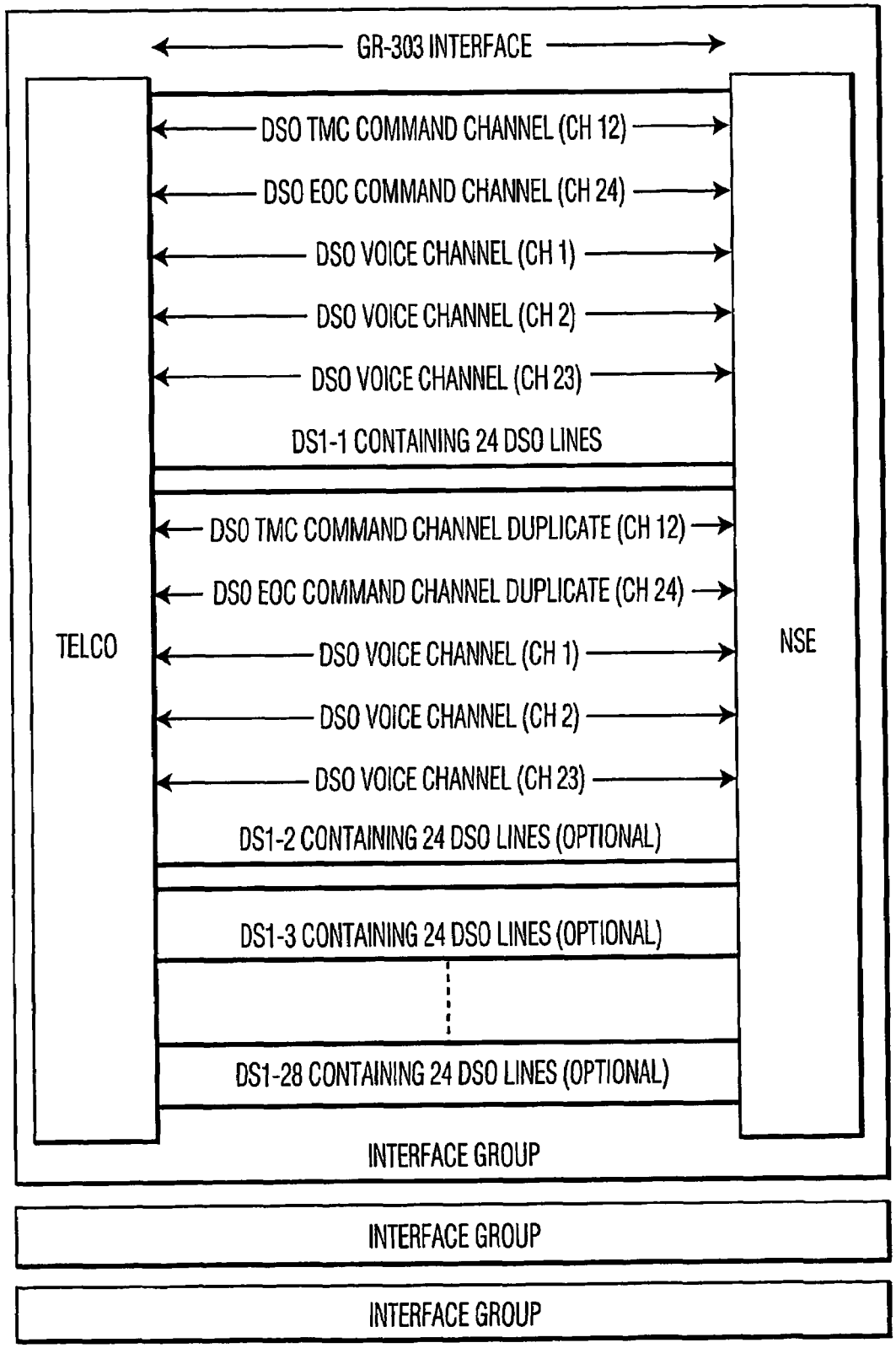
FIG. 8 is a block diagram illustrating the network system equipment ("NSE") to Telco interface.

FIG. 8 illustrates the interface between NSE 100 and the telco switch. In the present embodiment, the link between DSLAM 115 and ATM switch 113 is a DS3 which has 44.736 Mbps of bandwidth. With 300 CPEs there are 1200 possible phone connections. If all connections were made, transmitting data 86.835 Mbps of bandwidth would be needed between DSLAM 115 and ATM switch 113. This shows an over-subscription of 1.94 to 1 assuming that the entire bandwidth is for phone usage only. If a more typical over-subscription rate of 10:1 is used, for phones in use at one time, we will find that (1200/10=120 phones*72.362 Kbps=8.683 Mbps) 8.683 Mbps will be a more typical bandwidth usage. SCP 119 monitors and controls these connections to stay within available bandwidth limits.

The data paths that do not carry voice data (i.e., the Command and PC data channels) have a minimum bandwidth available for each path. Traffic management is less of a concern for SCP 119 in this case since the initial set-up of each data path specifies the path as UBR with a minimum and a maximum data rate. The ATM devices enforce this data rate as a function of the ATM protocol itself. As system throughput changes, the bandwidth for each channel is adjusted accordingly based on the amount of data attempting to be passed through that channel.

This requires that each potential "choke point" in the data path be implemented so that it will be able to handle the minimum amount of required bandwidth for the number of CPEs 104 connected to NSE 110.

Figure 9:
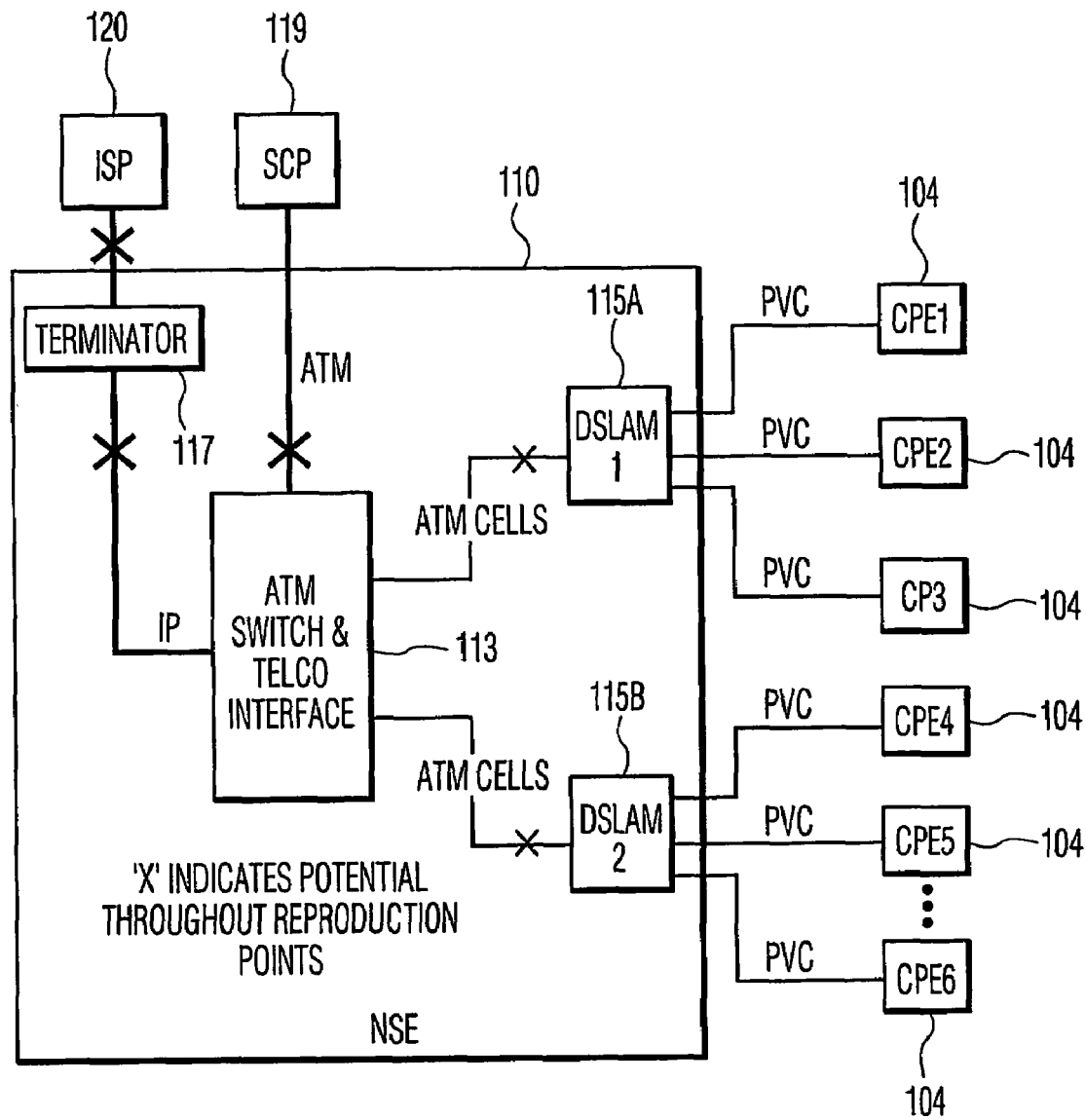
FIG. 9 is a block diagram illustrating throughput reduction points for data channels.

FIG. 9 is a block diagram illustrating examples of points where throughput can be reduced for PC traffic for a system consisting of 6 CPEs. Note that the control data to/from the CPE should not be blocked. Each of the PVCs in FIG. 9 has the potential to be limited at each location as indicated. Therefore, each link in that data path must be able to accommodate the required amount of bandwidth (including transmission protocol overhead) for the command and PC data channels connected to the system. As bandwidth approaches the link limit, the UBR traffic will begin to go to slower rates. This process continues until the minimum values, which were provisioned, are met or until additional bandwidth becomes available. CPE 104 and DSL Terminator 117 can also be controlled by SCP 119 to further throttle the traffic coming into the system.

NSE 110 to telephone network 116 interface is based on T1 lines, which are gathered as an Interface group. According to the GR-303 interface, an Interface Group (IG) may contain from 1 to 28 DS1 connections. Each DS1 has 24 DS0 channels. Channels 12 and 24 are used for control information on the first DS1 connection. If there is a second DS1 in the IG, it contains redundant control information on channels 12 and 24. These channels are only used on the first 2 DS1 connections. All other DS1 connections utilize all 24 channels for voice traffic.

Figure 10:
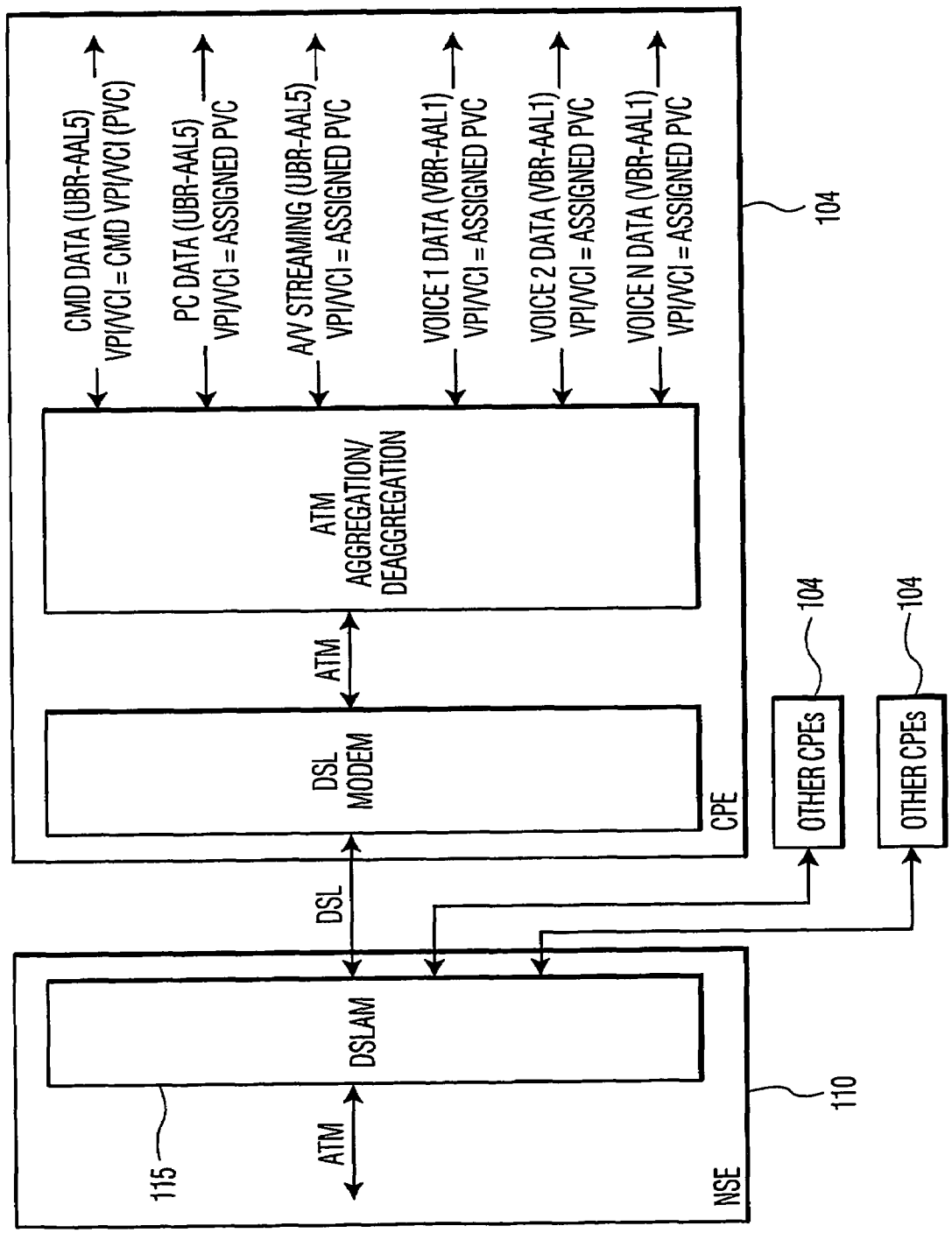
FIG. 10 is a block diagram illustrating NSE to CPE interface.

NSE 110 is connected to each CPE 104 by the physical copper loop between DSLAM 115 and the customer premise. FIG. 10 is a block diagram of the data paths between the CPEs 104 and NSE 110. The Command and PC data paths are UBR while all of the voice and AV streaming paths are specified as RT-VBR and are assigned a unique VPI/VCI for each path. The Command channel is a data channel to NCS 112 (and ultimately to SCP 119) so that a CPE 104 is always in contact with NCS 112. Bandwidth is allocated so that the maximum number of CPEs 104 have sufficient bandwidth to always allow communication with NCS 112. The PC data path is also a non-blocking channel but may drop to a minimum of 28 Kbps in the event of network congestion. This non-blocking channel requires that sufficient bandwidth is allocated accordingly.

ADSL Multimedia Delivery System 100 is capable of managing a number of CPEs 104 that is higher than the number of physical connections available on the ATM side of DSLAM 115. Therefore, NCS 112 must be capable of dynamically managing the traffic bandwidth in order to provide an acceptable quality of service for customers. The present invention provides a management system that exists on SCP 119 that monitors the link between DSLAM 115 and ATM switch 113 for the purposes of enabling the over subscription of the line and preventing overload conditions on the network. The connection for voice through the ATM/ADSL system as discussed in the network control system design specification is that each voice connection is provisioned as a variable bit rate-real time ATM virtual circuit and the bandwidth on this link is managed by SCP 119. SCP 119 needs to know the total amount of bandwidth available on the link between ATM switch 113 and the DSLAM 115.

In the present system, voice traffic receives higher priority than data traffic. Once system 100 becomes loaded to a pre-determine level, for example 85%-90% (combined voice and data), the bandwidth management system enforces a reduction at DSLAM 115. SCP 119 then actively modifies the amount of downstream and upstream bandwidth available for data at each customer as determined in their connection profile. This allows the higher priority for voice traffic through the network.

To insure quality of service during high traffic periods, upstream and downstream data traffic rates are controlled at DSL Terminator 117 via SNMP commands and CPEs 104 via the CPE Command Interface.

The bandwidth on an ATM trunk is calculated as follows:
BW=Total available bandwidth on the ATM trunk (i.e. DS3=45 Mbps, OC3=155 Mbps).

Read total number of calls in progress (TC) from Real-Time database.
Sum the bandwidth for each video connection (VB) from the Real-Time database.
Available data bandwidth (AVB)=BW−(((TC×64 kbps)+VB)×53/47)

The available bandwidth limit is adjustable via the user interface. The available bandwidth limit is the value of bandwidth left unused at which the data traffic rates will begin to be restricted. In the present embodiment, the default limit is set at 15%. If the available bandwidth becomes less than the programmed limit (or 15%) of the total bandwidth ((AVB/BW)*100<15), then upstream and downstream data rates are modified as noted below. If the available bandwidth is greater than the programmed limit (or 15%) and there are restrictions imposed, then the restrictions are removed up to the point where AVB is the programmed limit or greater.

Figure 11:
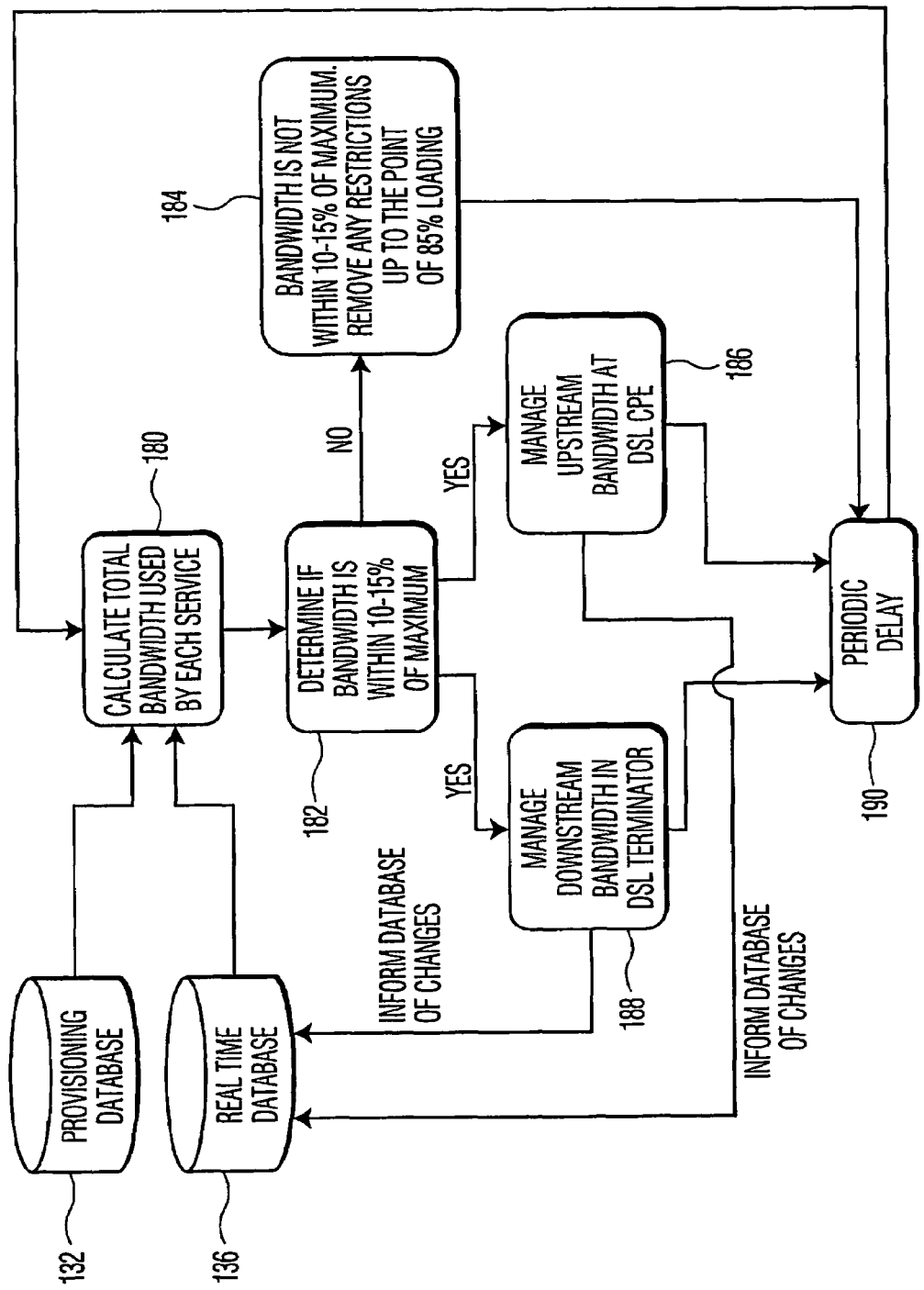
FIG. 11 is a flowchart illustrating the steps performed in the dynamic bandwidth management system according to the present invention.

FIG. 11 illustrates a flowchart showing the steps performed by the present dynamic bandwidth management system. The system periodically monitors and determines the amount of bandwidth being used in the system in steps 180 and 190. The determination is performed in view of the data in the provisioning database 132 and real time database 136. In response to the data, SCP 119 determines whether the bandwidth usage is within a predetermined level of the maximum, for example 10%-15%. If the bandwidth usage is less than the predetermined maximum, SCP 119 removes any restrictions up to a maximum level, for example 85%. If the bandwidth usage is above the predetermined level, SCP 119 imposes a restriction, either at the upstream entry point in step 186 or at the downstream bandwidth entry point in step 188. Alternatively, both the upstream and downstream throttling may be performed if the bandwidth usage exceeds a second predetermined level. This process is continued until bandwidth usage drops below the desired level, thereby avoiding an overloaded condition in the system. The restriction throttles the data, that is, reduces the data entering the system, for example, by controlling the rate that the data is output from the buffers of DSL terminator 117 or CPEs 104.

For downstream data throttling, the throttling is performed at the back-end entry point to the DSL network, in this case, at DSL terminator 117. The data rates allowed on each provisioned PVC in an ATM implementation are temporarily set to lower limits in order to help prevent an overflow condition within the network and also allow other services of higher priority to obtain the necessary resources. In the present embodiment, DSL terminator 117 performs the throttling using a "leaky-bucket" algorithm. The leaky-bucket algorithm regulates the burstiness of the traffic by throttling the data back so it is possible to enter the network at a controlled rate. This throttling mechanism is remotely controlled by SCP 119 through SNMP or other similar protocol.

For upstream data throttling, the throttling is performed at the customer entry point of the network, namely the CPEs 104. The data rates entering the network here are also throttled back by using a leaky-bucket algorithm. The throttling is dependent upon the amount of load the system is experiencing. The upstream traffic control at CPEs 104 is also controlled by SCP 119. The dynamic bandwidth management system described above is a continually running background process that periodically polls the system to collect information of the resource availability.

Although an exemplary embodiment that incorporates the teachings of the present invention has been shown and described in detail hereinabove, those skilled in the art may readily devise many other varied embodiments that still incorporate these teachings. Therefore, this application is intended to cover such departures from the present disclosure as come within known or customary practice in the art to which this invention pertains and which fall within the limits of the appended claims.

The invention claimed is:

1. A communications system, comprising:
   network system equipment coupled to, and providing connections between, a circuit switched telephone network, a plurality of customer premise equipment ("CPE") located at a plurality of customer premises, and the internet via a network terminator, for providing voice and data services to the plurality of customer premises; and
   a network control system, coupled to the network system equipment, for coordinating connections between the plurality of CPEs and the circuit switched telephone network and the internet, and for managing traffic therebetween, the network control system including:
      a first database that includes system configuration information and configuration information for each CPE coupled to the network system equipment;
      a second database that includes information indicative of service connections currently being utilized in the communications system and the usage by each CPE; and
      a control processor for periodically polling the first database and the second database to determine a bandwidth level currently being utilized in the communications system and throttling the amount of data services entering the communications system in response to the determined bandwidth utilization level using a two-tiered bandwidth throttling technique which comprises: (i) performing a first type of bandwidth throttling if the determined bandwidth utilization level exceeds a first predetermined level which is less than a maximum useable bandwidth level and (ii) performing both the first type of bandwidth throttling and a second type of bandwidth throttling if the determined bandwidth utilization level exceeds a second predetermined level which is less than the maximum useable bandwidth level, wherein the first type of bandwidth throttling includes providing first command data to the network terminator to thereby enable the network terminator to control the amount of data services entering the communications system via the internet, and the second type of bandwidth throttling includes providing second command data to the CPEs to thereby enable the CPEs to control the amount of data services entering the communications system via the customer premises.

2. The communications system according to claim 1, wherein the communications system is a DSL system and the network system equipment comprises:
   a DSLAM coupled to the plurality of CPEs, and
   an ATM switch coupled to the DSLAM, the circuit switched telephone network, and to the internet via the network terminator, wherein the network terminator is a DSL terminator, and
   the control processor is coupled to the ATM switch for throttling the amount of data services entering the DSL system.

3. The communications system according to claim 2, wherein the ATM switch is further coupled to an A/V streaming source for providing streaming media data to the CPEs.

4. The communications system according to claim 1, wherein at least one of the first and second types of bandwidth throttling includes using a leaky-bucket algorithm.

5. The communications system according to claim 4, wherein at least one of the first and second command data uses SNMP.

6. The communications system according to claim 1, wherein at least one of the first and second command data uses SNMP.

7. The communications system according to claim 2, wherein if the amount of data services entering the DSL system has been reduced, the control processor removes any restrictions on the amount of data services entering the DSL system when the determined bandwidth utilization level is below the first predetermined level.

8. In a communications system comprising: network system equipment coupled to, and providing connections between, a circuit switched telephone network, a plurality of customer premise equipment ("CPE") located at a plurality of customer premises, and the internet via a network terminator, for providing voice and data services to the plurality of customer premises; and a network control system, coupled to the network system equipment, for coordinating connections between the plurality of CPEs and the circuit switched telephone network and the internet, and for managing traffic therebetween, a method for controlling the communications system comprising the steps of:
   providing a first database that includes system configuration information and configuration information for each CPE coupled to the network system equipment;
   providing a second database that includes information indicative of service connections currently being utilized In the communications system and the usage by each CPE;
   periodically polling the first database and the second database to determine a bandwidth level currently being utilized in the communications system; and
   throttling the amount of data services entering the communications system in response to the determined bandwidth utilization level using a two-tiered bandwidth throttling technique which comprises: (i) performing a first type of bandwidth throttling if the determined bandwidth utilization level exceeds a first predetermined level which is less than a maximum useable bandwidth level and (ii) performing both the first type of bandwidth throttling and a second type of bandwidth throttling if the determined bandwidth utilization level exceeds a second predetermined level which is less than the maximum useable bandwidth level, wherein the first type of bandwidth throttling includes providing first command data to the CPEs to thereby enable the CPEs to control the amount of data services entering the communications system via the customer premises, and the second type of bandwidth throttling includes providing second command data to the network terminator to thereby enable the network terminator to control the amount of data services entering the communications system via the internet.

9. The method according to claim 8, wherein the communications system is a DSL system and the network system equipment comprises a DSLAM coupled to the plurality of CPEs, and an ATM switch coupled to the DSLAM, the circuit switched telephone network, and to the internet via the network terminator, wherein the network terminator is a DSL terminator.

10. The method according to claim 8, wherein at least one of the first and second types of bandwidth throttling includes using a leaky-bucket algorithm.

11. The method according to claim 10, wherein at least one of the first and second command data uses SNMP.

12. The system according to claim 8, wherein at least one of the first and second command data uses SNMP.

13. The method according to claim 9, wherein the throttling step further comprises, if the amount of data services entering the DSL system has been reduced, removing any restrictions on the amount of data services entering the DSL system when the determined bandwidth utilization level is below the first predetermined level.

\* \* \* \* \*

UNITED STATES PATENT AND TRADEMARK OFFICE
CERTIFICATE OF CORRECTION

PATENT NO.       : 7,619,973 B2                                         Page 1 of 1
APPLICATION NO.  : 10/483536
DATED            : November 17, 2009
INVENTOR(S)      : Richardson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Twenty-sixth Day of October, 2010

David J. Kappos
*Director of the United States Patent and Trademark Office*